US006813682B2

United States Patent
Bress et al.

(10) Patent No.: US 6,813,682 B2
(45) Date of Patent: Nov. 2, 2004

(54) WRITE PROTECTION FOR COMPUTER LONG-TERM MEMORY DEVICES

(76) Inventors: Steven Bress, 9801-C Gable Ridge Ter., Rockville, MD (US) 20850; Mark Joseph Menz, 114 Rawlings Ct., Folsom, CA (US) 95630

( * ) Notice: Subject to any disclaimer, the term of this patent is extended or adjusted under 35 U.S.C. 154(b) by 266 days.

(21) Appl. No.: 09/961,417

(22) Filed: Sep. 25, 2001

(65) Prior Publication Data

US 2002/0040418 A1 Apr. 4, 2002

Related U.S. Application Data

(60) Provisional application No. 60/237,761, filed on Sep. 29, 2000.

(51) Int. Cl.$^7$ .............................................. G06F 12/00
(52) U.S. Cl. ...................... 711/112; 711/163; 711/164; 713/161; 713/164; 713/165; 713/166
(58) Field of Search ................................ 711/112, 164; 713/161, 164, 165, 166

(56) References Cited

U.S. PATENT DOCUMENTS

| | | | | |
|---|---|---|---|---|
| 4,654,829 A | * | 3/1987 | Jiang et al. ............ 365/189.03 |
| 4,734,851 A | | 3/1988 | Director ...................... 364/200 |
| 4,811,293 A | | 3/1989 | Knothe et al. .............. 365/189 |
| 5,144,660 A | | 9/1992 | Rose ............................... 380/4 |
| 5,268,960 A | | 12/1993 | Hung et al. .................... 380/4 |
| 5,289,540 A | | 2/1994 | Jones ............................. 380/4 |
| 5,325,499 A | | 6/1994 | Kummer et al. ............ 395/425 |
| 5,369,616 A | | 11/1994 | Wells et al. ................. 365/218 |
| 5,557,674 A | | 9/1996 | Yeow ............................. 380/4 |
| 5,687,379 A | | 11/1997 | Smith et al. ................. 395/726 |
| 5,991,402 A | * | 11/1999 | Jia et al. ........................ 705/59 |
| 6,041,385 A | | 3/2000 | Shipman et al. ............ 710/200 |
| 6,041,394 A | | 3/2000 | Halligan et al. ............ 711/166 |
| 6,092,161 A | | 7/2000 | White et al. ................. 711/163 |
| 6,126,070 A | * | 10/2000 | Fukuzumi .................... 235/380 |
| 6,212,635 B1 | * | 4/2001 | Reardon ...................... 713/165 |
| 6,216,205 B1 | * | 4/2001 | Chin et al. .................. 711/131 |
| 6,230,288 B1 | * | 5/2001 | Kuo et al. ...................... 714/38 |
| 6,330,648 B1 | * | 12/2001 | Wambach et al. .......... 711/163 |
| 6,336,187 B1 | * | 1/2002 | Kern et al. .................. 713/161 |
| 6,345,368 B1 | * | 2/2002 | Bergsten ....................... 714/11 |
| 6,446,209 B2 | * | 9/2002 | Kern et al. .................. 713/193 |
| 6,516,999 B1 | | 2/2003 | Bélonožnik .................. 235/382 |
| 6,629,184 B1 | | 9/2003 | Berg et al. .................. 710/306 |
| 6,654,864 B2 | * | 11/2003 | Shaath et al. ............... 711/163 |

FOREIGN PATENT DOCUMENTS

| WO | WO 93/09495 | 5/1993 |
| WO | WO 93/13477 | 7/1993 |
| WO | WO 01/88724 A2 | 11/2001 |

OTHER PUBLICATIONS

Patent Abstracts of Japan, Publication No. 06337781, Dec. 6, 1994, NEC Home Electron Ltd.
Patent Abstracts of Japan, vol. 1995, No. 05, Jun. 30, 1995 & JP 7 037207, Feb. 7, 1995; 1 page.
Peter Gutmann: "Secure Deletion of Data from Magnetic and Solid–State Memory," Proceedings of the USENIX Security Symposium, Jul. 22, 1996; 14 pages.

* cited by examiner

Primary Examiner—Donald Sparks
Assistant Examiner—Ngoc V Dinh
(74) Attorney, Agent, or Firm—Harrity & Snyder, LLP (57) ABSTRACT

A blocking device provides read and write protection for computer long-term storage devices, such as hard drives. The blocking device is placed between a host computer and the storage device. The blocking device intercepts communications between the host and the storage device and examines any commands from the host to the storage device. Certain commands, such as commands that may modify the storage device, may be discarded.

45 Claims, 9 Drawing Sheets

Fig. 1A

Read Sector Command

| Register | Data |
|---|---|
| Features | |
| Sector Count | Sector Count |
| Sector Number | Sector Number or LBA |
| Cylinder Low | Cylinder Low or LBA |
| Cylinder High | Cylinder High or LBA |
| Device/Head | Device ID and Head Number or LBA |
| Command | 020h |

Command Register — 115, 101, 102, 103, 104, 105, 106

Fig. 1B

Write Sector Command

| Register | Data |
|---|---|
| Features | |
| Sector Count | Sector Count |
| Sector Number | Sector Number or LBA |
| Cylinder Low | Cylinder Low or LBA |
| Cylinder High | Cylinder High or LBA |
| Device/Head | Device ID and Head Number or LBA |
| Command | 030h |

Command Register — 115, 101, 102, 103, 104, 105, 106

WRITE PROTECTION FOR COMPUTER LONG-TERM MEMORY DEVICES

RELATED APPLICATION

This application claims priority under 35 U.S.C. § 119 based on U.S. Provisional Application No. 60/237,761, filed Sep. 29, 2000, the disclosure of which is incorporated herein by reference.

BACKGROUND OF THE INVENTION

1. Field of the Invention

The present invention relates to computer memory devices and, more specifically, to mechanisms for controlling user access to the memory devices.

2. Description of Related Art

There are many situations in which it is desirable to allow data to be read from a non-volatile long-term memory storage device, such as a computer hard drive, but not allow data to be written to the device. For example, law enforcement officials have occasion to confiscate long-term memory storage devices. Once confiscated, the law enforcement officials need to be able to examine the storage device without changing the storage state of the device. Some operating systems, such as the Windows® operating systems from Microsoft Corporation, may modify the storage device when accessing files on the device, even if the user is only trying to read files from the device. In addition, during startup, operating systems such as Windows® will write up to hundreds of megabytes of data to a storage device as the operating system initializes. These situations are not acceptable when trying to preserve the state of a storage device to its as-confiscated state.

An example of another situation in which it is desirable to allow data to be read from a storage device but not written is in the area of computer security. A computer that is connected to other computers through a network, such as the Internet, is vulnerable to attack. A malicious hacker may attempt to write/change data on a target computer. Although most modern computers have some form of software password protection, these passwords can be bypassed, or "hacked," by a determined attacker. In addition, attacks can come from viruses that are inadvertently transmitted between computers. One way to minimize or prevent damage from such attacks is to block the modification of all of or of certain predetermined sensitive areas of the computer's storage device.

There are a number of known conventional techniques for write protecting memory devices, such as hard drives. One class of early techniques revolved around the concept of disabling a write gate signal transmitted between the drive's controller and the drive's storage media. These techniques are not easy to implement with more modern hard drives, however, because the drive controller and storage media are integrated into a single closed system. Accordingly, the write gate signal is no longer easily accessible. Further, within the more modern integrated hard drives, the write gate signal may be implemented as a signal etched onto an integrated circuit and would, thus, be difficult to electrically contact even if the drive were opened.

A second class of drive write protection techniques is based on software protection of the drive. In general, these techniques involve the installation of software that modifies the read/write parameters of the system. One disadvantage of these techniques is that they tend to be operating system specific. This creates the potential burden of properly installing, updating, and operating the software. Additionally, because installing software may change the state of the storage device, software techniques are not appropriate in situations, such as in law enforcement, in which not changing the state of the storage device is a priority.

A final class of drive protection techniques is based on inserting hardware devices designed to operate with particular computer configurations, such as a card inserted into a host's PCI bus. Such devices are also not without their limitations. For example, the devices may only work with certain types of computer systems or may only block predefined write commands. These limitations can be problematic if the device is not compatible with the desired computer system or if new write commands are introduced which are not recognized by the device.

Accordingly, there is a need in the art for an improved mechanism for write protecting a memory device, such as a disk drive.

SUMMARY OF THE INVENTION

Systems and methods consistent with the present invention address these and other needs by providing for an operating system independent blocking device that is physically inserted between a host computer and a storage device.

One aspect of the invention is directed to a blocking device including a plurality of elements. Specifically, the blocking device includes an interface emulator configured to emulate an interface presented by a storage device and an interface for connecting to a storage device. Additionally, the blocking device includes a processor coupled to the interface emulator and the interface. The processor examines commands received through the interface emulator that are generated by a host and intended for the storage device and allows only those of the commands that match a predetermined set of commands to pass.

A second aspect of the invention is directed to a device that includes an IDE emulator component, an IDE interface, and a logic circuit. The IDE emulator component includes a physical interface designed to engage a first cable that connects to a host that controls an IDE storage device. The IDE interface is configured to engage a second cable that connects to the IDE storage device. The logic circuit connects the IDE emulator component to the IDE interface and compares commands received at the IDE emulator component to a predetermined set of commands and blocks transmission of one or more of the commands from the IDE emulator component to the IDE interface when the comparison indicates that the logic circuit does not recognize the received command or the comparison indicates that the received command is a command that modifies the storage device.

Another device consistent with the invention includes an emulator component, the emulator component including a physical interface designed to connect to a host that controls a storage device. Additionally, an interface is configured to connect to the storage device and a logic circuit connects the emulator component to the interface and is configured to compare information received at the emulator component to a computer virus definition file and to block transmission of storage commands from the emulator component to the interface when the comparison indicates a match with the computer virus definition file.

Another aspect of the invention is a method that intercepts communications between a computer motherboard and a local storage device and compares commands in the communications between the motherboard and the storage device to a predetermined set of commands. Additionally, the method includes forwarding selected ones of the commands to the storage device based on the comparison and blocking selected other ones of the commands from being received by the storage device based on the comparison.

Yet another aspect of the invention is directed to a computer system. The computer system includes a host computer, a long-term storage device, and a blocking device coupled between the host computer and the storage device. The blocking device is configured to intercept commands from the host to the storage device and to block certain commands from reaching the storage device and to pass other ones of the commands to the storage device.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

A blocking device is described herein that blocks certain operations, such as read or write operations, as they are transmitted to a storage device. The blocking device is physically inserted between a host computer system and the storage device and is transparent to the host and the storage device.

The storage device may be any type of long-term non-volatile memory device. For example, the storage device may be a hard disk drive or compact flash memory. In one implementation, the storage device uses an Integrated Drive Electronics (IDE) interface. An IDE interface is a well-known electronic interface that is frequently used to connect a computer's motherboard and disk drive. In IDE drives, the disk drive controller is built into the physical case of the disk drive. The IDE interface provides a relatively high level interface between the motherboard and the disk drive.

Although concepts consistent with the present invention are primarily described herein in relation to an IDE magnetic hard disk drive, these concepts may be implemented with other types of IDE media, such as flash memory with an IDE interface. Flash memories are a special type of semiconductor random access memory that retains its data after power has been removed from the system. Other types of media useable with an IDE interface include magnetic tape and optical media, such as a compact disc (CD) and a digital versatile disc (DVD). In addition to the IDE interface, concepts consistent with the invention may be applied in a straightforward manner to other types of high level storage interfaces, such as the well known Small Computer System Interface (SCSI) standard or a hard drive connected through an IEEE 1394 (Firewire) connection.

For the sake of clarity the remaining description herein will be described with reference to an IDE magnetic hard drive, although, as mentioned above, the concepts of the invention are not limited to such drives. One skilled in the art would appreciate that other modern long-term storage device interfaces share similar functionality that could be incorporated into the concepts described herein.

IDE Drive

As previously mentioned, communications with an IDE drive occurs through its IDE interface. The IDE interface is a well-defined interface that has addressable memory registers in which the host device (e.g., the computer motherboard) can write commands. The host may also read these registers to, for example, retrieve status information. The IDE interface may additionally include memory used to buffer data going to or coming from the storage media.

Figure 1A:
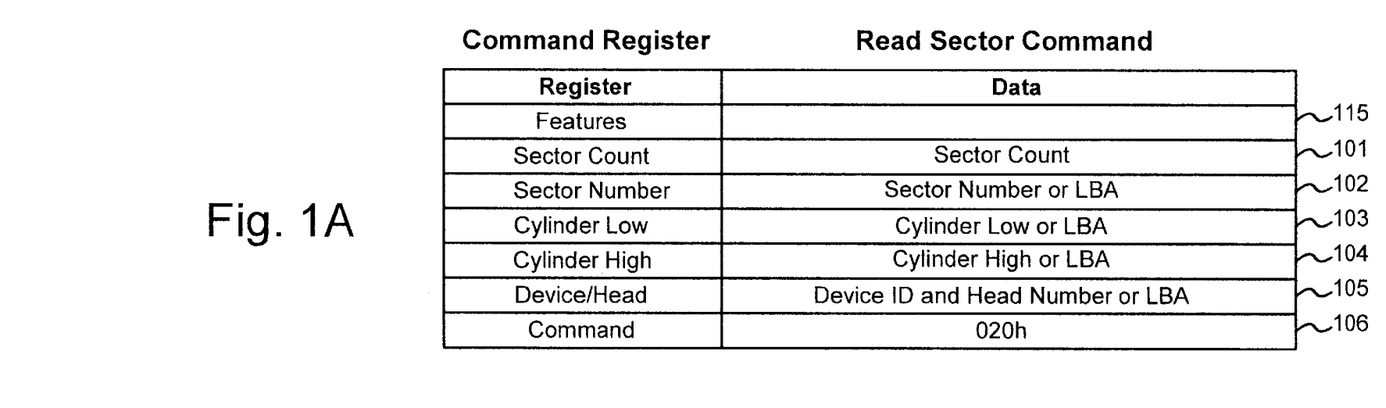
FIGS. 1A and 1B are diagrams illustrating register layouts for an IDE interface.
Figure 1B:
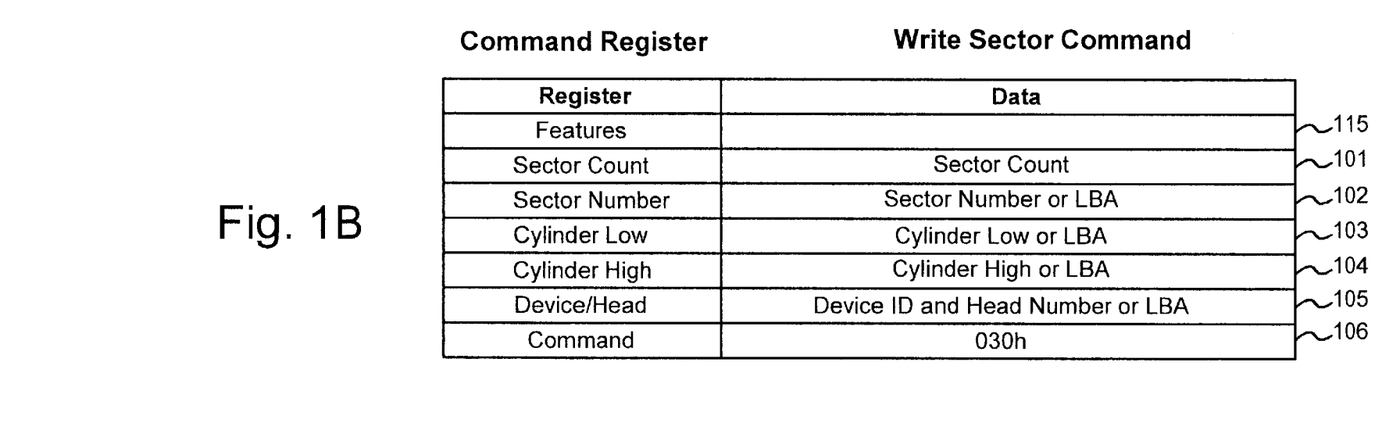

FIGS. 1A and 1B are diagrams illustrating register layouts for an IDE interface through which a host transmits read commands (FIG. 1A) and write commands (FIG. 1B). When reading from a drive, the host uses sector count register 101, sector number register 102, cylinder low register 103, cylinder high register 104, device ID/head number register 105, and command register 106. The host writes the number of sectors that it would like to read into sector count register 101. The host writes to registers 102, 103, 104, and part of register 105 to tell the drive how many sectors are to be read by the command. In order to read a sector from a drive, the host writes a series of bytes to these registers.

Register 101 is a sector count register that tells the drive how many sectors should be read by the read command. For older drives, the sector was specified in a more convoluted way, using sector number register 102, cylinder number registers 103 and 104, and a head number in register 105. For backwards compatibility, these designations are still shown in the illustrated drive command table. More recent drives may use the Logical Block Addressing mode, or LBA, to describe the starting sector number. In this mode, the starting sector number is directly specified.

Register 105 has one bit reserved to specify a device number. Up to two drives may share the same IDE cable. This reserved bit is used to select between the two drives. With two drives, one is designated as a "master" device and the other is designated as a "slave" device. Both drives on the cable receive all of the commands, but only the drive that corresponds to the state of the reserved bit will act on commands.

The drive begins to execute commands when the host writes a read command (illustrated as hexadecimal number 020 in FIG. 1A) to register 106. For a read command, the drive will retrieve data from the drive platters and start transferring data to the host.

FIG. 1B illustrates the register layout for a write command. The register layout is similar to that of a read command. Sector count register 101 holds the number of sectors that are to be written. Also, the address of the starting sector is set in sector number register 102, cylinder low register 103, cylinder high register 104, and device ID/head number register 105 in the same manner in which the host sets the starting sector for a read command. The drive begins to execute the write commands when the host writes a write command (illustrated as hexadecimal number 030) to command register 106. In general, the only difference between the read and write command is in the value written to the command register 106.

In FIGS. 1A and 1B, register 115 is a "feature" register through which an IDE drive may pass data. As can be seen from the above description of the read and write register layouts, the host must write data to at least some of registers 101–106 in order to issue either a read or a write command to the drive. Therefore, for the drive to be read, the interface lines connecting the host to the IDE drive must be allowed to operate. The drive has no way to determine whether the incoming command will be a read or write until the command register is written.

BLOCKING DEVICE

Figure 2:
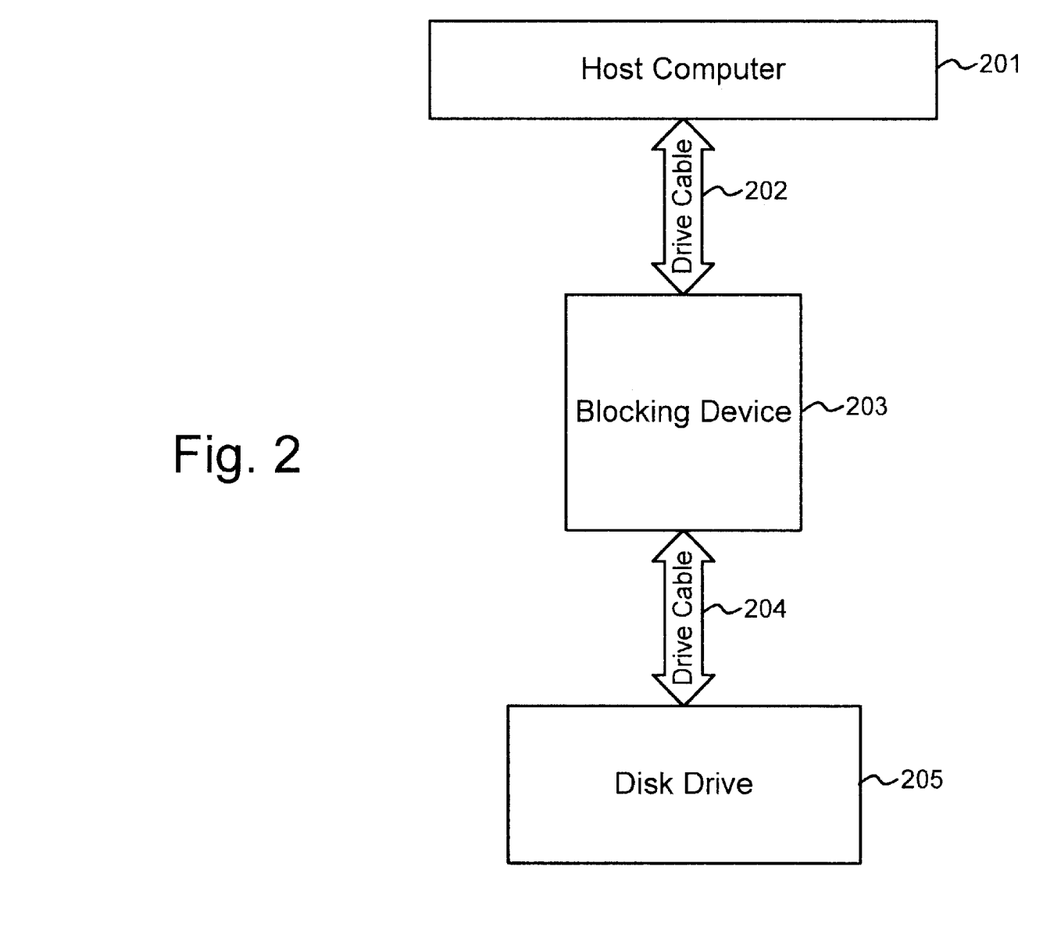
FIG. 2 is a diagram illustrating a blocking device consistent with concepts of the invention.

FIG. 2 is a diagram illustrating a blocking device 203 consistent with the present invention. Blocking device 203 may be a physical device inserted between a host computer 201 and a long-term storage device, such as hard disk drive 205. Host computer 201 may be connected to blocking device 203 through a standard cable 202. Similarly, drive 205 may be connected to blocking device 203 through a standard cable 204.

To host computer 201, blocking device 203 appears to be a standard drive interface, such as an IDE drive interface, and presents to the host 201 the memory, registers, and control signals that a drive would normally present to host 201. To drive 205, blocking device 205 appears to be a host computer, and presents to drive 205 the memory, registers, and control signals that host 201 would normally present to drive 205. In other words, blocking device 203 is transparent to the system. This is advantageous, as blocking device 203 is therefore operating system independent and does not require software to be installed on host 201. Moreover, blocking device 203 may be physically designed to aid an untrained user in connecting it in the correct direction. More specifically, in one implementation, the cables may be color coded or physically mated to encourage the user to connect the cables in the correct direction. When cables 202 and 204 are plugged into blocking device 203, the blocking device is completely installed and ready to operate. Accordingly, installation of blocking device 203 can be performed by users that are relatively unsophisticated in the computer field.

Figure 3:
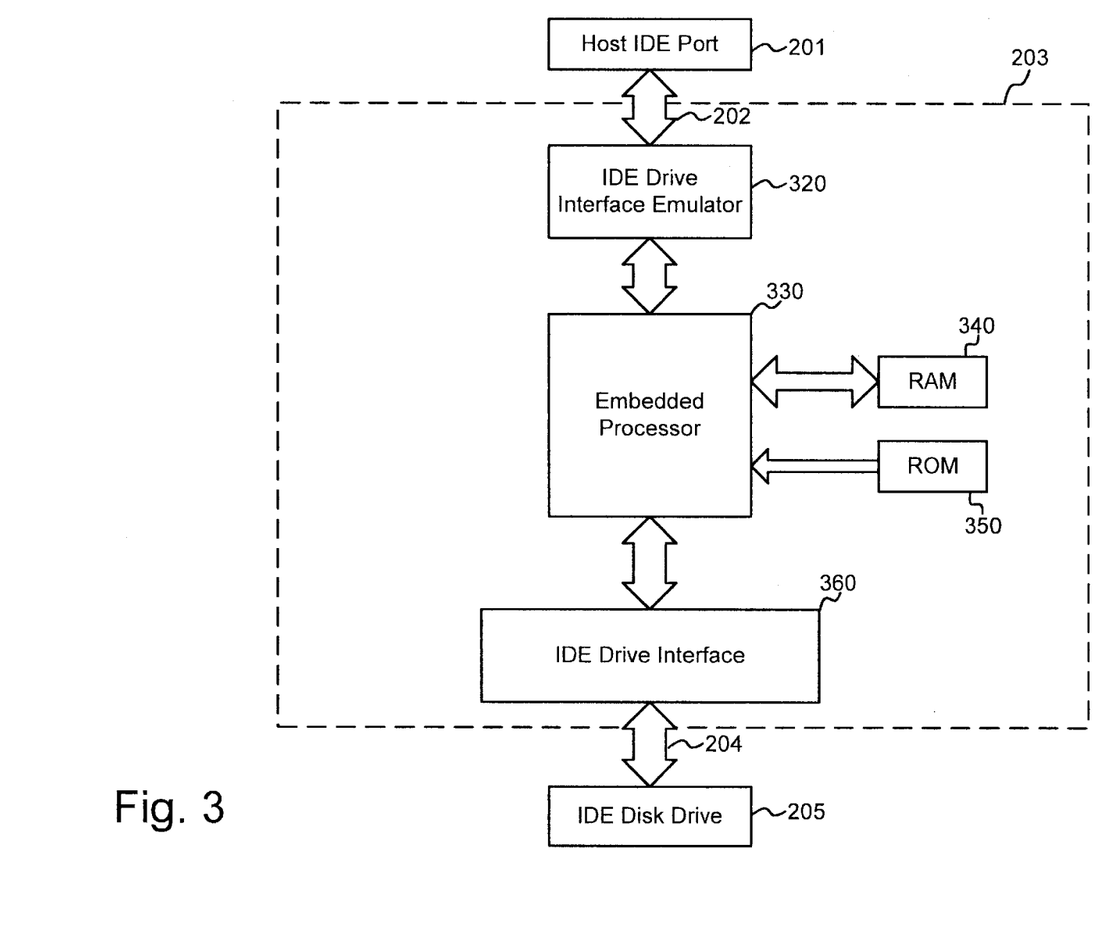
FIG. 3 is a diagram illustrating the blocking device of FIG. 2 in additional detail.

FIG. 3 is a diagram illustrating blocking device 203 in additional detail. Blocking device 203 includes three main components: an IDE drive emulator 320, embedded processor 330, and IDE drive interface 360. When host 201 attempts to communicate with drive 205, the host 201 is actually communicating with IDE drive emulator 320. Drive emulator 320 delays the communication from host 201 until embedded processor 330 has examined the communication. Embedded processor 330, based on its examination of the command from host 201, may either pass the command to IDE drive interface 360 or drop (block) the command. IDE drive interface 360 is a standard IDE drive interface that connects blocking device 203 to drive 205.

Embedded processor 330 may be additionally coupled to RAM 340 and ROM 350. RAM 340 and ROM 350 are computer readable media that may store processing instructions and data used by embedded processor 330.

In operation, if embedded processor 360 determines that a command received at IDE drive interface emulator 320 is an acceptable command to pass along to the drive, such as a read request or a capabilities request, embedded processor 330 passes the command to the registers in drive 205 through IDE drive interface 360. Additionally, with certain commands, embedded processor 360 may modify the command such that it will not modify the drive before passing the modified command to the drive. IDE drive interface 360 may receive any requested information back from drive 205. This received information may then pass through embedded processor 330 and IDE drive interface emulator 320 before it is transmitted to host 201.

If embedded processor 330 determines that a command received through IDE drive interface 320 is a write command, embedded processor 330 drops the command and, thus, does not write anything to drive 205. Blocking device 203, however, will continue to accept the correct amount of data from host 201 as specified in the write command. Embedded processor 330 may simply discard this data and may then return status information to host 201 that indicates that the write was successful. From the point of view of host 201, the data transfer will have succeeded.

Because the only data path to drive 205 goes through blocking device 203, there is no data path to the drive for even an accidental write, thereby providing absolute write protection. Further, because the blocking device 203 only allows commands that it knows are safe (i.e., commands that will not modify the drive) to pass, the drive cannot be modified by the host.

Figure 4:
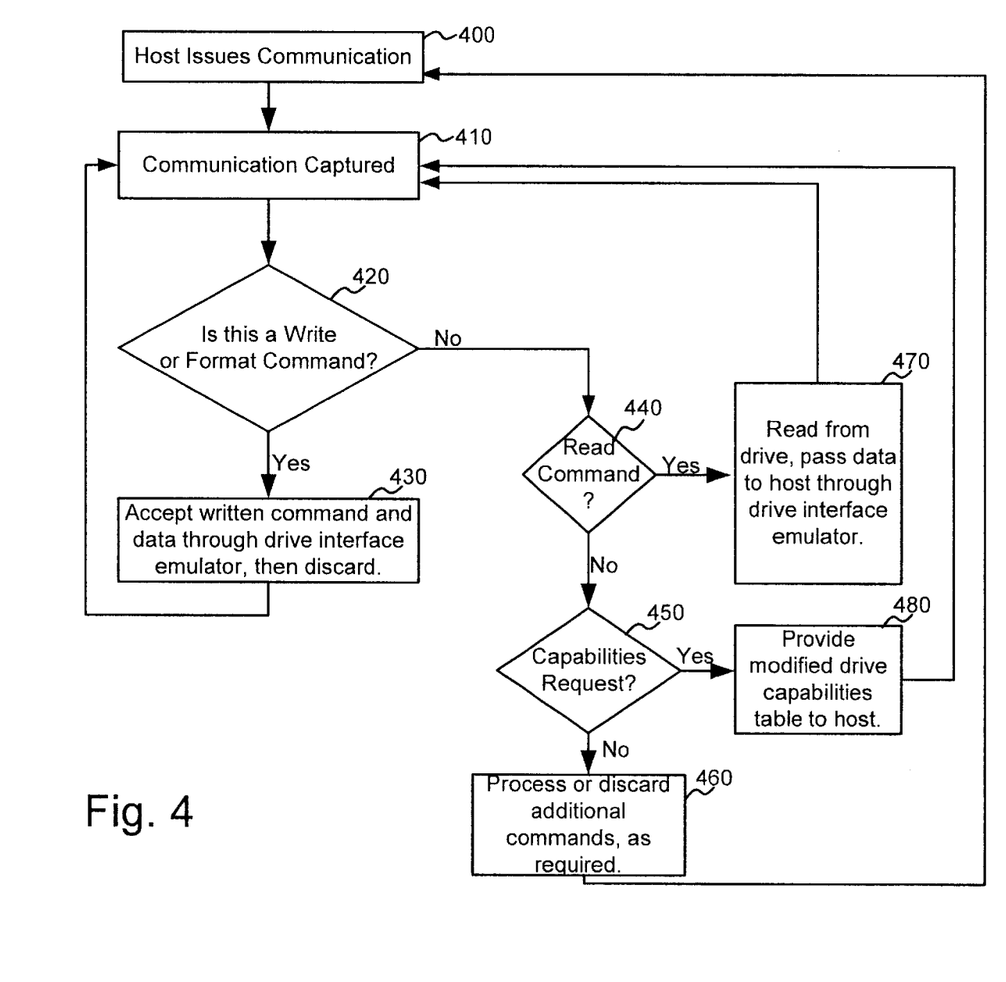
FIG. 4 is a flow chart illustrating the operation of the blocking device.

FIG. 4 is a flow chart illustrating the operation of blocking device 203 in additional detail. To begin, host 201 communicates a command to drive 205 (act 400). The blocking device 203 captures and holds communications until they are examined (act 410). The communication is examined for whether it is a write or format command and/or any command that changes data on the drive 205. If yes, the command and any associated data is accepted by blocking device 203, and then discarded, blocking it from the protected drive 205 (acts 420 and 430). Because the blocking device 203 accepts the command and any data associated with the command, such as the data the host 201 intends to write to drive 205, the host 201 believes the command and associated data has been successfully sent to drive 205.

Host communications that are not data changing commands are examined to determine if they are read commands (act 440). If it is a read command, embedded processor 330 passes the command to the protected drive 205 and any returned data is passed to host 201 (act 470). If the command is not a read command, embedded processor 330 examines the command to determine if it is a capabilities request (act 450). If the command is a capabilities request, embedded processor 330 reports the drive's capabilities back to host 201 (act 480). In some cases, certain drive capabilities may be modified by the processing time required by blocking device 203. Accordingly, in this situation, embedded processor 330 may modify the reported capabilities to reflect the actual capability of the drive 205 including any latency introduced by blocking device 203 (act 480). For example, embedded processor 330 may report back the actual drive storage space but may report a modified drive throughput rate that reflects any delay introduced by the blocking device 203. Finally, if the command is not recognized by embedded processor 330, the embedded processor 330 may discard the command (act 460). By discarding non-recognized commands, embedded processor 330 can ensure that only safe commands are passed.

In an alternate implementation to that described above, embedded processor 330 may maintain a list of "forbidden" commands. Any received commands that are in the list are dropped.

DETAILS OF AN IMPLEMENTATION OF THE BLOCKING DEVICE

Figure 5:
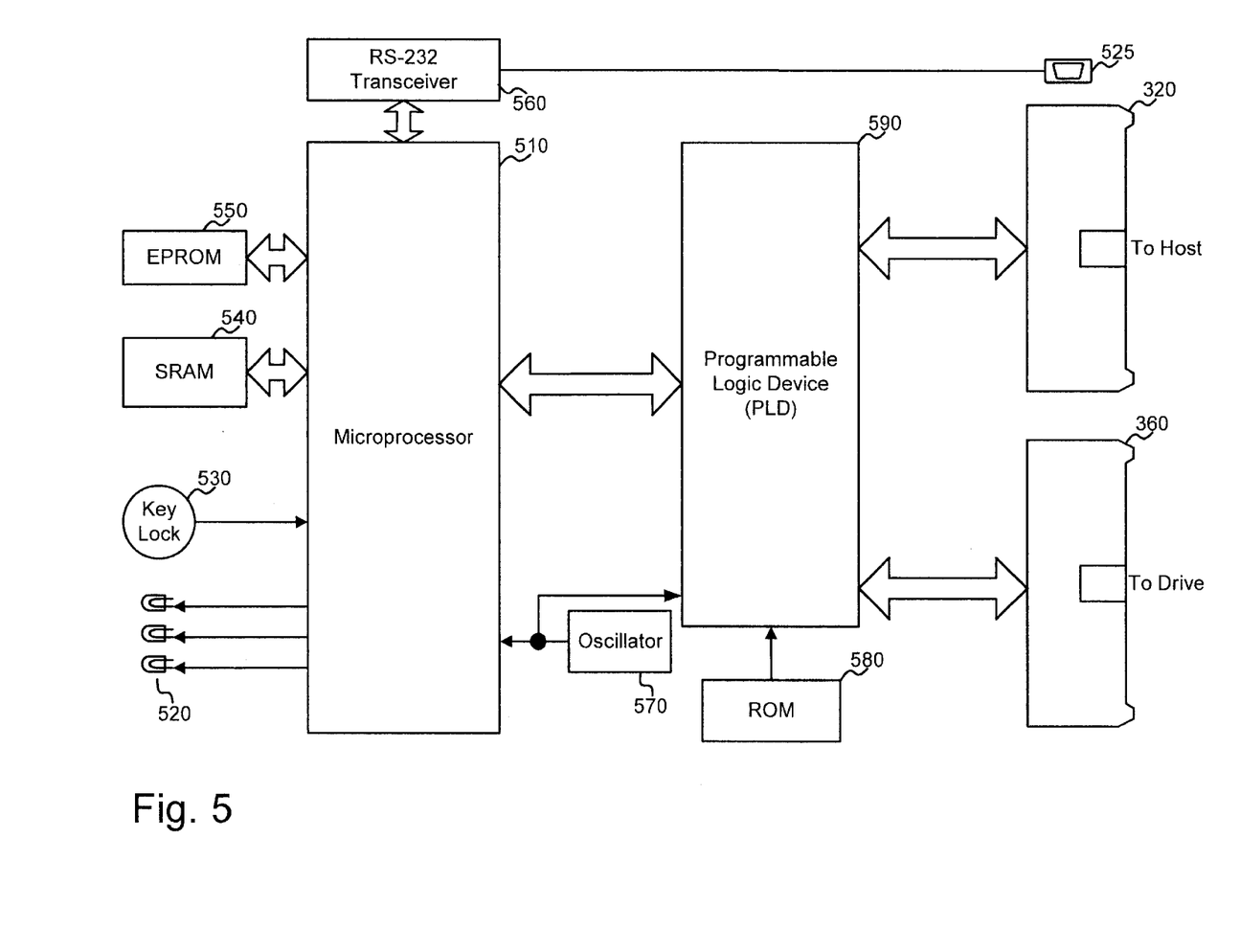
FIG. 5 is block diagram illustrating the blocking device of FIGS. 2 and 3 in even more detail.

FIG. 5 is block diagram illustrating an exemplary implementation of blocking device 203 in additional detail. The blocking device includes microprocessor 510 and programmable logic device (PLD) 590. Microprocessor 510 may be an embedded processor, such as the 80386 EX embedded processor manufactured by Intel Corporation, of Santa Clara, Calif. The integrated design of microprocessor 510 allows relatively little additional circuitry to be used to create a small, dedicated computer system. PLD 590 complements microprocessor 510 by performing logical operations required by the microprocessor 510 or other circuitry of the device 203. ROM 580 stores configuration data that is initially loaded into PLD 590 on start-up. Similarly, EPROM 550 stores the initial code necessary to initialize and run microprocessor 510. Static RAM (SRAM) 540 is also connected to microprocessor 510, and is used for temporary program and data storage. Crystal oscillator 570 provides clocking signals to microprocessor 510 and PLD 590. In one implementation, crystal oscillator 570 generates a 50 MHz clock signal.

Microprocessor 510 may control a number of external devices, such as LED status indicators 520 and a processor key lock 530. Through LED status indicators 520, microprocessor 510 may provide easily understandable feedback to a user. Processor key lock 530 is a physical interface through which a user must insert a physical key to enable microprocessor 510.

In addition to connecting to host 201 and drive 205 through interfaces 320 and 360, respectively, microprocessor 510 may be connected to external devices via RS-232 port 525 and RS-232 transceiver 560. RS-232 port 525 may be a standard DB9 connector that allows connections using a standard DB9 male to female serial cable.

One of ordinary skill in the art will recognize that the components shown in FIG. 5 may be selected from a wide variety of commercially available components. In one implementation, the components in FIG. 5 may be selected as follows: PLD 590, part number EP1 K50QC208-2, available from Altera Corporation of San Jose, Calif.; ROM 580, part number EPC1 PC8, available from Altera Corporation; EPROM 550, part number AT27LV020A90JC, available from Atmel Corporation, of San Jose, Calif.; and SRAM 540, part number CY7C1021V33L12ZCT, available from Cypress Corporation, of San Jose, Calif.

Figure 6:
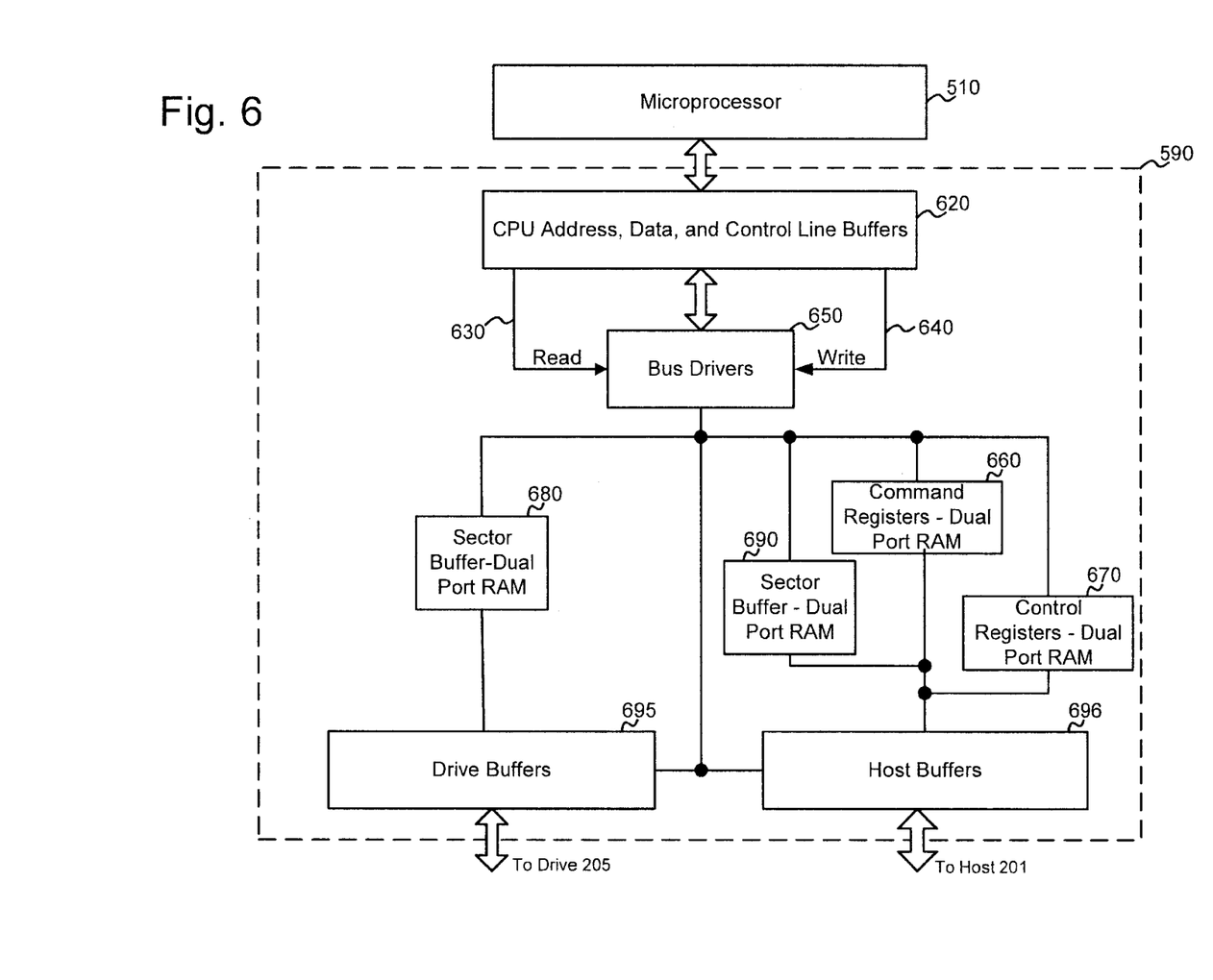
FIG. 6 is diagram graphically illustrating the functionality of portions of the blocking device shown in FIG. 5.

FIG. 6 is diagram that graphically illustrates the functionality of PLD 590 in additional detail. Address, data, and control lines from the processor 510 are routed to PLD 590 where their information is buffered and latched as necessary in buffers 620. Buffers 620 serve to reduce the electrical load on the processor and to stabilize the signal timing. Buffer read and write signals 630 and 640 control the direction of the bus drivers 650. Thus, bus drivers 650 may write data into buffers 620 when read signal 630 is active and read data out of buffers 620 when write signal 640 is active. Buffers 620 and bus drivers 650 help control the data flow and distribution of the address and data busses from the processor 510 to other portions of PLD 590.

Buffering and signal conditioning for the disk drive 205 is provided by drive buffers 695, which form the drive interface with the disk drive 205. Through the bus drivers 650, the microprocessor 510 can directly read and write to the drive interface. Instead of directly communicating with drive buffers 695, bus drivers 650 may indirectly communicate with drive buffers 695 through dual ported RAM sector buffer 680. Sector buffer 680 provides an additional layer of buffering between the microprocessor 510 and the drive 205. This allows the drive to write one sector's worth of data to RAM at high speed, while the processor 510 reads a previous sector's worth of data. By allowing the operations to overlap in this fashion, the processor 510 is not restricted to running at the speed of the drive 205, and is free to handle other functions until it needs the data in the sector buffer 680.

Buffering and signal conditioning for host 201 is provided by drive buffers 696, which form the interface with the host 201. Through bus drivers 650, microprocessor 510 can directly read and write to the host buffers 696. A second way that microprocessor 510 and the drive 205 may communicate is through the dual ported RAM sector buffer 690. In a manner similar to the drive interface, the sector buffer 690 allows the host 201 to communicate at high speed without requiring immediate attention from the processor 510.

In addition to sector buffer 690, two other sections of dual ported RAM are provided by the PLD 590. These are control registers dual port RAM 670 and command registers dual port RAM 660. The control registers 670 may include eight bytes of RAM that appears to host 201 to be the hard drive's control register. Similarly, register 660 may be eight bytes of data that appears to the host to be the hard drive's command register. It is through these registers that the host 201 issues commands to the drive 205.

After a command has been written to the command byte of the command register 660, PLD 590 notifies microprocessor 510 that a command is pending. At this point, the acts illustrated in FIG. 4 are initiated. Because the command and control registers are both created with dual port RAM, the processor 510 may wait until the entire command has been issued to interrogate the contents of these registers. This provides for a zero wait state performance to the host 201, allowing for optimal system performance.

MULTIPLE DRIVE SUPPORT

As previously mentioned, a standard IDE interface can support up to two different drives connected through a single cable to the host. Generally, one of the drives is set as the master drive and the other is set as the slave drive. The host selects whether a command is intended for the master or the slave by setting a bit in the device ID/head number register 105.

Figure 7:
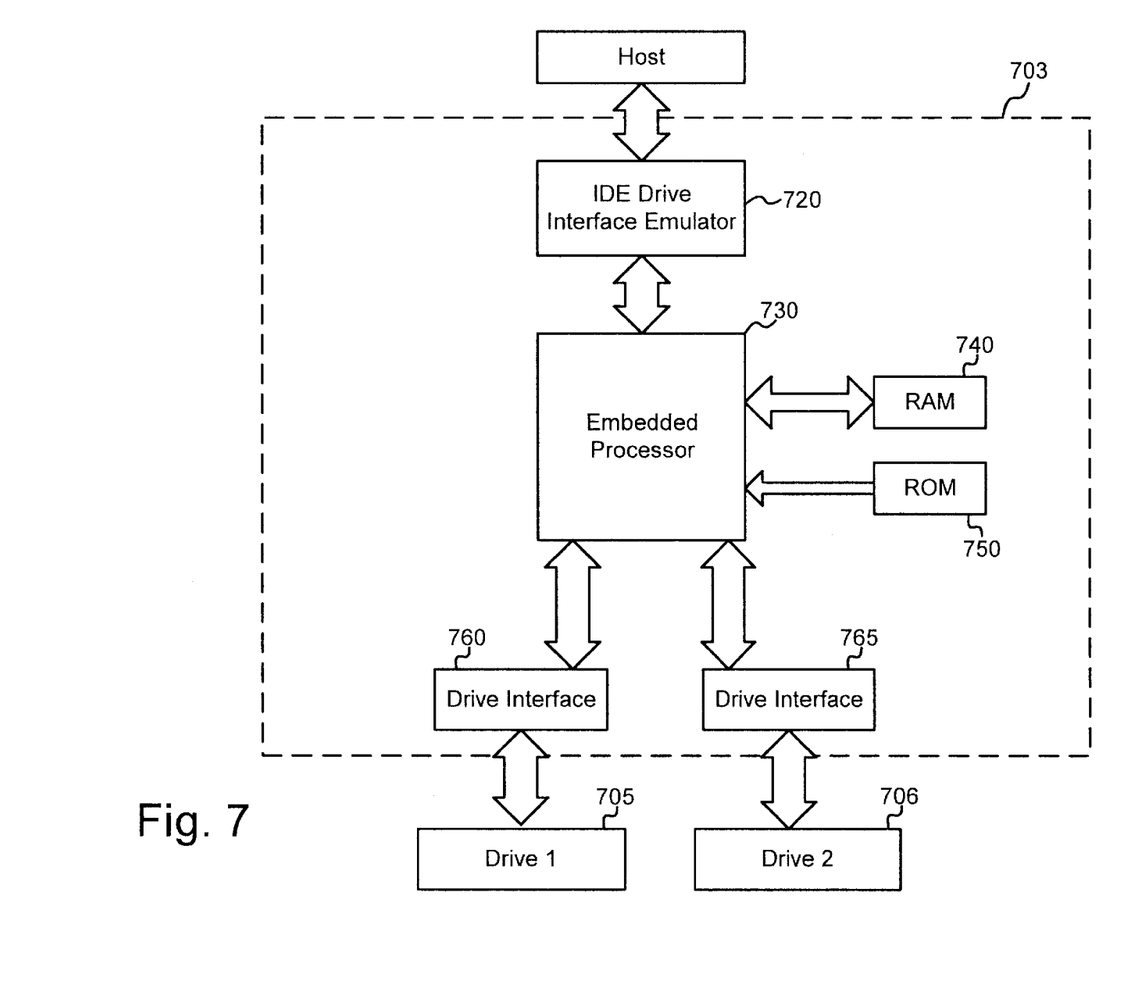
FIG. 7 is a diagram illustrating an embodiment of a blocking device capable of supporting two drives.

FIG. 7 is a diagram illustrating an embodiment of a blocking device 703 capable of supporting two drives 705 and 706. Blocking device 703 is similar to blocking device 203, as shown in FIGS. 2, 3, and 5. That is, blocking device 703 is connected to the host through IDE drive interface emulator 720, which connects the host to embedded processor 730. RAM 740 and ROM 750 may store processing instructions and data used by embedded processor 730. Unlike blocking device 203, however, blocking device 703 includes two IDE drive interfaces, labeled as drive interface 760 and drive interface 765.

In operation, embedded processor 730 examines register 105 to determine the intended destination for data received from the host and then forwards the data to the appropriate one of drive interfaces 760 and 765. Generally, jumper switches on the drives are used to set whether a particular drive operates as a master or a slave drive. During start up, embedded processor 730 may read the state of the jumper switches to determine the correct settings for the drives. Subsequently, embedded processor 730 transfers the data received from the host to the appropriate one of the two drives 705 and 706.

In a conventional dual-drive IDE interface, because a single cable connects both drives to the host, line noise or a line glitch could cause communications from the host meant for one drive to go to the other. With blocking device 703, however, because there are two independent cables from the blocking device 703 to drives 705 and 706, the drives are not exposed to the possibility of misinterpreting for which drive a signal is intended. Thus, once a valid signal reaches blocking device 703, a glitch on the drive cable will not cause an operation by the wrong drive.

Configuring a drive as a master or a slave requires that a user change physical jumpers on the drive. Conflicts may arise if two drives are configured as both master or both slave. Because blocking device 703 provides a unique and isolated IDE interface to each drive that it protects, even if there is a conflict, blocking device 203 can still independently communicate with each of the drives.

Further, blocking device 703 may operate so that while a data transfer is going on between the host and the blocking device 703, there is no activity on the signals going to a protected drive. This minimizes the possibility that any glitch on the data or control lines could inadvertently cause the drive to write data. In order for a write to occur, numerous registers need to be written to the drive with correct data. With blocking device 703 keeping the signals in a known state, it is unlikely that a random glitch would happen upon a sequence of data that could cause a write.

Blocking device 703 provides other benefits through virtue of its having one drive per IDE interface. Given the wide range of speeds of IDE devices, it may be unwise to run one device at a dramatically different speed than another on the same cable. The slower drive may misinterpret commands not intended for it, with unpredictable results. Accordingly, often when multiple devices are on an IDE cable, the fastest possible data transfer is at the speed of the slowest device. Because blocking device 703 provides each drive with its own interface, each drive can operate at its highest supported speed.

READ VERIFICATION AFTER WRITING

Figure 8:
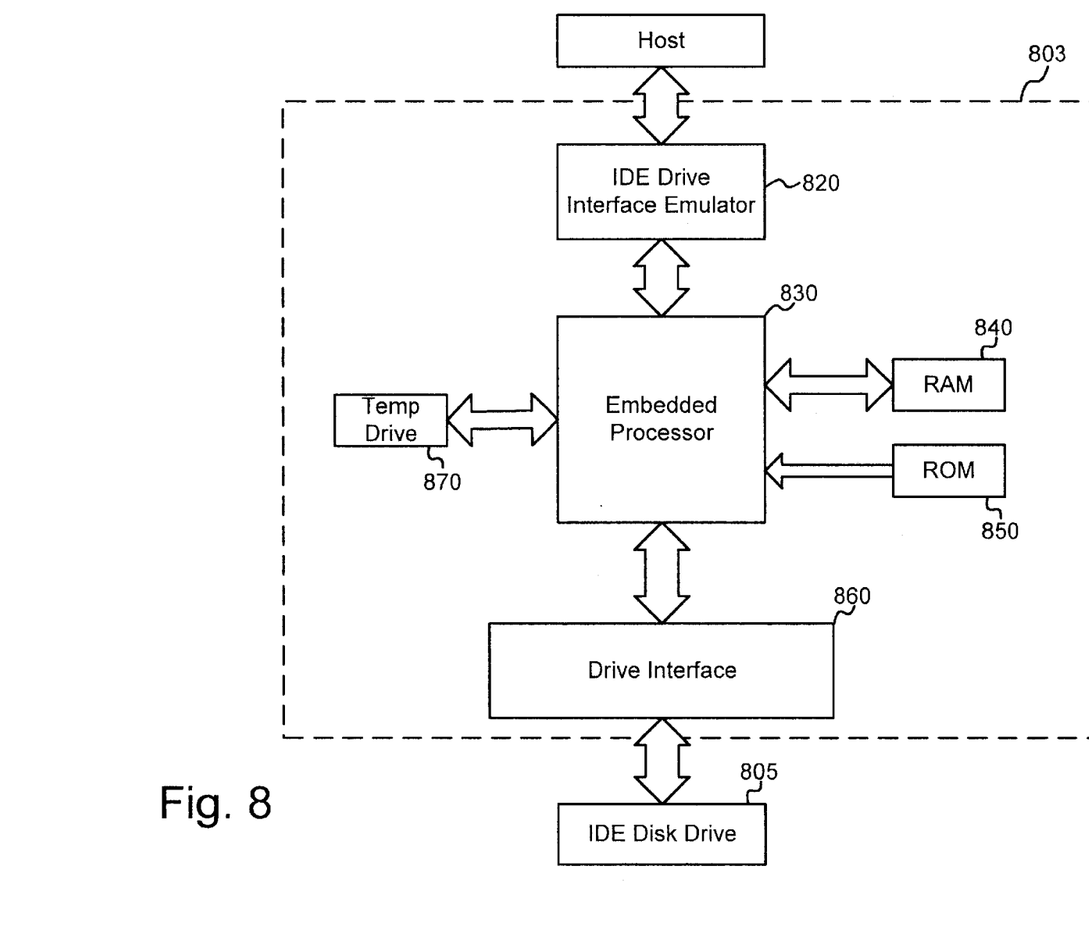
FIG. 8 is a diagram illustrating a blocking device capable of correctly operating with an operating system that uses read-back-after-write commands.

There are situations in which a host writes data to a drive and immediately tries to verify that the data was in fact written by attempting to read it back. In particular, some commands used by some older operating systems, such as DOS, act in this manner. FIG. 8 is a diagram illustrating an exemplary embodiment of a blocking device 803 capable of correctly operating with an operating system that uses read-back-after-write commands.

In general, blocking device 803 is similar to blocking device 203, except that blocking device 803 additionally includes a "temp drive" 870, which is a long term storage device such as a hard disk drive. More particularly, as shown in FIG. 8, blocking device 803 includes an embedded processor 830 that is coupled to drive interface emulator 820, drive interface 860, and temp drive 870. Additionally, embedded processor 830 may be connected to RAM 840 and ROM 850, which may store data and instructions used by embedded processor 830.

In operation, embedded processor 830, instead of discarding the data associated with blocked write commands, stores the data in temp drive 870. The drive being protected (i.e., drive 805) is not modified. Embedded processor 830 keeps track of the addresses written to temp drive 870. During a subsequent read operation that reads an address previously written to temp drive 870, embedded processor 830 returns the data stored in temp drive 870. For read requests that do not correspond to data previously written to temp drive 870, data is returned from drive 805. In this manner, blocking device 803 and drive 805 appear to the host as a normally functioning disk drive.

In one implementation, because it is reasonable that the host may write as much data as drive 805 can hold, temp drive 870 is as large as drive 805.

After a predetermined amount of time after a write to temp drive 870, when it is no longer reasonable to expect a read after write verification, embedded processor 830 may erase the data (or otherwise cause it to become not available) written to the temp drive 870. After this time all new read requests provide data from the protected drive 805. Blocking device 803 may also erase data on temp drive 870 if a new command comes in to read or write a different area of drive 805. This would indicate that any read after write verification of the earlier data had already occurred.

Although temp drive 870 is shown integrated within blocking device 803, in other implementations, temp drive 870 may be a separately attached drive. For example, in the implementation shown in FIG. 7, the temp drive may be a drive attached to second drive interface 765.

SELECTIVE BLOCKING

The implementations of the blocking devices described thus far have had a relatively simple blocking mechanism, such as blocking all write commands. In certain situations, however, it may be desirable for the embedded processor to implement more complex blocking rules.

Figure 9:
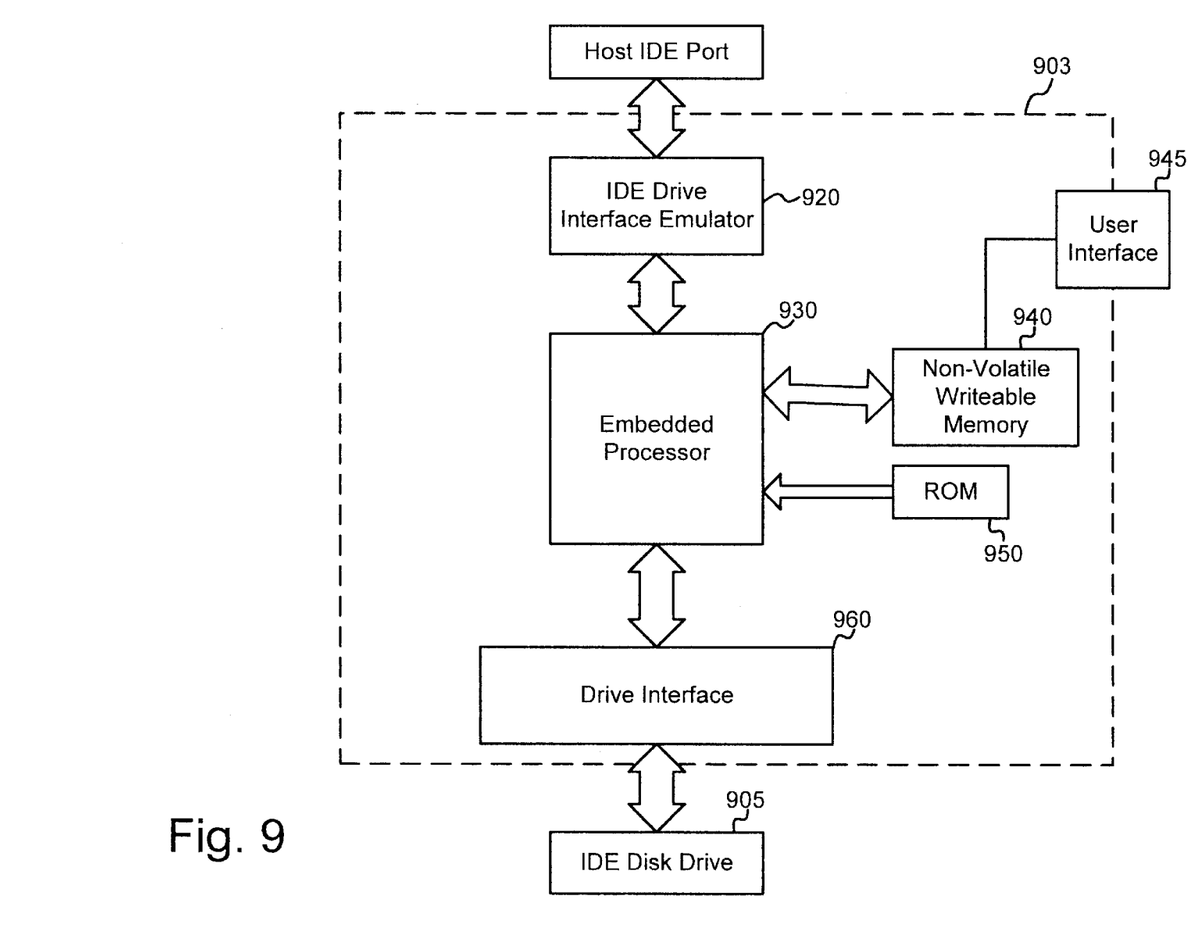
FIG. 9 is a diagram illustrating a blocking device capable of implementing more complex blocking rules.

FIG. 9 is a diagram illustrating an exemplary embodiment of a blocking device 903 capable of implementing more complex blocking rules. In general, blocking device 903 is similar to blocking device 203, except that blocking device 903 additionally includes a user interface 945 and non-volatile writeable memory 940 instead of RAM. Through user interface 940, which may be, for example, a USB (universal serial bus) port or a simple serial connection, users may store custom programming in memory 940. Memory 940 may be, for example, flash memory.

Rewriteable non-volatile memory 940 may be used to hold user changeable configuration information. The configuration information may, for example, instruct embedded processor 930 to allow write operations to pass to certain portions of drive 905, but to block all other write operations. In one implementation, in order to improve device security, users may only modify memory 940 through a separate physical cable connected to interface 945. Before modifying memory 940, embedded processor 930 may require that the user enter an appropriate user ID and password. Alternatively, blocking device 903 may require the user to insert a hardware key instead of a password before accepting user communications. In this fashion, blocking device 903 can be protected from attack from a remote device. In addition, blocking device 903 is protected from a local attack as long as the user IDs and passwords are kept secure.

Users may specify in memory 940 areas of drive 905 that the embedded processor 930 is to block (or not block) from write access. A user may configure memory 940 such that only a portion of drive 905 is blocked. This may be described in terms of a range of sectors. For a host connected to a network such as the Internet, this could provide absolute security against unauthorized access, whether accidental or intentional.

Often, the goal of a hacker is to disrupt the operating system on a host computer, causing it to crash. In other cases, the hacker tries to change restricted data on the system. With blocking device 903, the area of the drive 905 containing the operating system could be protected against writing, while user data areas, such as Web sites where data is collected from customers, could remain changeable. In this implementation, no type of attack can permanently harm important system files.

In a similar manner, it is possible to block unauthorized reads with blocking device 903. In this implementation, blocking device 903 may be configured with a list of passwords or other authorization information, and a corresponding list of areas of the drive 905 that require authorization to access. If a user does not provide appropriate authorization information, read and write access to the drive 905 is denied by blocking device 903.

VIRUS BLOCKING

Blocking device 903, in an alternate implementation, may be programmed to provide computer virus protection. Memory 940, or another memory accessible directly from the host, may be programmed with a virus definition table. Embedded processor 930 may then compare the data associated with write commands from the host against the virus definition table. If the comparison indicates that a virus may be present, embedded processor 930 can block the suspected write operation(s). In this manner, virus checks can be made in real-time by embedded processor 930 without taking any processing resources from the host.

Blocking device 903 may additionally provide feedback to users or to the host relating to the status of its virus checking. The feedback may be communicated in a number of ways. For example, a USB port or a serial port may be used to send information to an external device or to the host. Alternatively, a simple light may be actuated or the information may be transmitted back to the host as a drive error.

NEW FEATURE PROTECTION

More recent IDE drives may support additional features or commands not supported by older IDE drives. A host may determine the feature supported by a particular drive by issuing an "identify device" command to the drive. The drive responds by returning a data structure indicating its supported features. In one implementation, blocking device 203 (FIG. 3) may examine the data structure received from drive 205 and zero out any features not supported by the blocking device 203. In this manner, if a future version of an IDE drive supports a command, such as an erase command, that embedded processor 330 was not programmed to recognize, blocking device 203 could inform the host that the drive does not support this feature. Accordingly, the host would not attempt to modify the drive using that command.

HOSTS THAT USE LOCAL WRITE CACHE

Some host computer systems may use a local cache to improve the performance of their disk drive. In this local cache, data written to the disk drive is also written to local memory, such as local semiconductor random access memory. If a subsequent read command requests a portion of the data that was previously written to the cache, the host can retrieve the data directly from the cache and will not have to read from the slower disk drive.

Hosts using a local cache may encounter problems when connected to a disk drive through the above-described implementations of the blocking device. In particular, with the blocking device installed, the data in the cache may not accurately reflect the data on the disk drive, as the data on the disk drive was never truly written. Accordingly, in systems that include such a local hard drive cache, the user may, if allowed by the operating system, simply turn off the local hard drive cache.

In another implementation, blocking device 203 may support a removable drive feature set and report itself to the host as a removable drive. Many operating systems support the removable drive feature set. One feature of the removable drive feature set is that a write request may be rejected by the target drive with a "write protected error" code. This allows the operating system to gracefully fail and to not mark the write cache as valid. Accordingly, in operating systems that support the removable drive feature set and that use a local disk cache, embedded processor 330, in addition to dropping data that the host attempts to write to the disk drive, may also issue a write protected error code to the host.

In yet another implementation, the blocking device may report to the host that the drive media is either not present or has been changed since the last write. In both of these cases, the operating system should fail gracefully and not mark the write cache data as valid.

SUPPORT FOR OBSOLETE COMMANDS

Embedded processor 330 may be configured to respond to certain commands with a predetermined response pattern. For example, in systems with older BIOS (basic input/output system) software, the BIOS may issue a "recalibrate drive" command during system start-up. Generally, the recalibrate drive command causes the hard drive to perform a potentially time consuming calibration operation that may modify the drive. Embedded processor 330 may handle the recalibrate drive command by accepting the command and reporting a successful completion of the command to the host. However, embedded processor 330 does not pass the command to the disk drive. In this manner, the system is able to successfully initialize.

SUMMARY

As described above, a blocking device is inserted between a host computer system and a storage device. The blocking device blocks certain commands, such as write commands, from being sent to the storage device. An embedded processor within the blocking device controls functionality of the blocking device. The functionality of the embedded processor can be programmably modified to allow for a number of different possible blocking options.

Although the blocking device has been primarily described as blocking write commands, one of ordinary skill in the art will appreciate that the blocking device could instead or additionally block read commands.

It will be apparent to one of ordinary skill in the art that the embodiments as described above may be implemented in many different forms of software, firmware, and hardware in the implementations illustrated in the figures. The actual software code or specialized control hardware used to implement aspects consistent with the present invention is not limiting of the present invention. Thus, the operation and behavior of the embodiments were described without specific reference to the specific software code, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A blocking device comprising:
    an interface emulator configured to emulate an interface presented by a storage device and configured to connect to a host;
    an interface for connecting to the storage device; and
    a processor coupled to the interface emulator and the interface, the processor examining commands received through the interface emulator that are generated by the host and intended for the storage device, the processor allowing only those of the commands that match a predetermined set of commands to pass to the storage device via the interface, the predetermined set of commands being commands that are known to not permanently modify a state of the storage device, wherein the blocking device is transparent to normal operation of the host and the storage device.

2. The blocking device of claim 1, wherein the interface is an integrated device electronics (IDE) interface for a disk drive.

3. The blocking device of claim 1, wherein the processor receives data back from the storage device in response to the commands passed to the storage device and forwards the received data to the host through the interface emulator.

4. The blocking device of claim 3, wherein, when the commands include a capabilities request command relating to the storage device, the processor modifies data received from the storage device relating to the capabilities request command to reflect the capability of the storage device as affected by the presence of the blocking device.

5. The blocking device of claim 1, wherein the processor drops those of the commands that do not match the predetermined set of commands, and, after dropping one of the commands, returns status information to the host that indicates that the dropped command was successfully completed.

6. The blocking device of claim 1, further comprising:
    additional interfaces for connecting to additional storage devices.

7. The blocking device of claim 6, wherein each of the interfaces is independently coupled to the processor.

8. The blocking device of claim 1, further including light emitting diodes (LEDs) coupled to the processor and configured to transmit status information relating to the status of the blocking device.

9. The blocking device of claim 1, further including:
    a temporary storage device coupled to the processor, the processor storing data from the host corresponding to at least one command that does not match the predetermined set of commands in the temporary storage device.

10. The blocking device of claim 9, wherein when read commands are received from the host that refer to data stored in the temporary storage device, the processor returns the data from the temporary storage device to the host.

11. The blocking device of claim 1, wherein the processor examines feature information from the storage device that relate to features supported by the storage device and the processor zeroes any features not supported by the processor before making the feature information available to the host.

12. The blocking device of claim 1, wherein the processor supports a removable drive feature set with the host and the processor returns a write protected error code to the host when the processor drops one of the commands.

13. A device comprising:
    an IDE emulator component, the IDE emulator component including a physical interface designed to engage a first cable that connects to a host that controls an IDE storage device;
    an IDE interface configured to engage a second cable that connects to the IDE storage device; and
    a logic circuit connecting the IDE emulator component to the IDE interface and configured to: compare commands received at the IDE emulator component to a predetermined set of commands that are known to not modify a state of the IDE storage device, and to allow transmission of the commands from the IDE emulator component to the IDE interface when the comparison indicates that the received command is in the predetermined set of commands, wherein
    the device operates transparently to normal operation of the host and the IDE storage device.

14. The device of claim 13, wherein the logic circuit includes:
    an embedded processor,
    a computer memory connected to the embedded processor, the embedded processor loading program instructions from the computer memory during device initialization, and
    a programmable logic device (PLD) coupled to the embedded processor, the IDE emulator component, and the IDE interface.

15. The device of claim 14, wherein the PLD includes:
    a bus driver component configured to transfer data between the embedded processor, the IDE emulator component, and the IDE interface,
    a first dual port memory buffer connected between the bus driver and the IDE interface,
    a first set of communication lines connecting the bus driver directly to the IDE interface and indirectly to the IDE interface through the first dual port memory buffer,
    a second dual port memory buffer connected between the bus driver and the IDE emulator component, and
    a second set of communication lines connecting the bus driver directly to the IDE emulator component and indirectly to the IDE emulator component through the second dual port memory buffer.

16. The device of claim 13, wherein when the logic circuit receives data back from the IDE storage device the logic circuit forwards the received data to the host through the IDE emulator component.

17. The device of claim 16, wherein, when the comparison indicates the command includes a capabilities request command relating to the IDE storage device, the logic circuit modifies data received from the IDE storage device relating to the capabilities request command to reflect the capability of the IDE storage device as affected by the presence of the device.

18. The device of claim 13, wherein the logic circuit commands not in the predetermined set of commands and, after blocking transmission of one of the commands, returns status information to the host that indicates that the blocked command was successfully executed.

19. The device of claim 13, further comprising:
a second interface for connecting to a second IDE storage device.

20. The device of claim 19, wherein each of the interfaces is independently coupled to the logic circuit.

21. The device of claim 13, further including light emitting diodes (LEDs) coupled to the logic circuit and configured to transmit status information relating to the status of the device.

22. The device of claim 13, further including:
a temporary storage device coupled to the logic circuit, the logic circuit storing data corresponding to commands that are not allowed to be transmitted to the IDE interface in the temporary storage device.

23. The device of claim 22, wherein when read commands are received from the host that refer to data stored in the temporary storage device, the logic circuit returns the data from the temporary storage device to the host.

24. The device of claim 13, wherein the logic circuit examines feature information from the IDE storage device that relates to features supported by the IDE storage device and removes any feature information not supported by the device before making the feature information available to the host.

25. A method comprising:
intercepting communications between a computer motherboard and a local non-volatile storage device for the motherboard;
comparing commands in the communications between the motherboard and the storage device to a predetermined set of commands;
forwarding selected ones of the commands to the storage only when, based on the comparison, the commands are determined to be commands that are in a predetermined set of commands known to not permanently modify a state of the storage device; and
blocking other commands from being received by the storage device, wherein
the intercepting communications, comparing commands, forwarding selected ones of the commands, and blocking selected other ones of the commands is transparent to normal operation of the computer motherboard and the storage device.

26. The method of claim 25, further comprising:
forwarding data from the storage device to the motherboard in response to a read command received from the motherboard and forwarded to the storage device.

27. The method of claim 25, wherein the storage device is an integrated device electronics (IDE) disk drive.

28. The method of claim 25, wherein the commands forwarded to the storage device include a capabilities request command, the method further comprising:
modifying data received from the storage device relating to the capabilities request command to reflect the capability of the storage device as modified by operation of the method.

29. The method of claim 28, further comprising, after blocking a command:
returning status information to the motherboard that indicates that the blocked command was successfully executed by the storage device.

30. A computer system comprising:
a host computer;
a long-term storage device; and
a blocking device coupled between the host computer and the storage device, the blocking device configured to:
intercept commands from the host to the storage device,
pass commands to the storage device only when the commands are in a predetermined set of commands that are known to not permanently modify a state of the storage device, and
block other commands from reaching the storage device,
wherein the intercepting commands, blocking commands, and passing commands are performed by the blocking device transparently to the host computer and the long-term storage device.

31. The computer system of claim 30, wherein the blocking device further includes:
an interface emulator configured to emulate the storage device to the host; and
an interface configured to connect the blocking device to the storage device.

32. The computer system of claim 31, wherein the interface emulator emulates an Integrated Device Electronics (IDE) interface and the storage device is an IDE disk drive.

33. The computer system of claim 30, wherein the blocking device receives data back from the storage device in response to one of the passed commands and forwards the received data to the host.

34. The computer system of claim 30, wherein, when the passed commands include a capabilities request command relating to the storage device, the blocking device modifies data received from the storage device relating to the capabilities request command to reflect the capability of the storage device as affected by the presence of the blocking device.

35. The computer system of claim 30, wherein the blocking device, after blocking one of the commands, returns status information to the host that indicates that the blocked command was successfully completed.

36. The computer system of claim 30, wherein the blocking device further includes light emitting diodes (LEDs) configured to transmit status information relating to the status of the blocking device.

37. The computer system of claim 30, wherein the blocking device further includes:
a temporary storage device, the blocking device storing data from the host corresponding to blocked commands in the temporary storage device.

38. The computer system of claim 37, wherein when read commands are received from the host that refer to data stored in the temporary storage device, the blocking device returns the data from the temporary storage device to the host.

39. The computer system of claim 30, wherein the blocking device further includes:
a user configurable memory, the user configurable memory storing instructions that define protected areas on the storage device, the blocking device dropping those of the commands that would otherwise modify the protected areas on the storage device.

40. A blocking device comprising:

means for intercepting communications between a host and a storage device;

means for comparing commands in the communications between the host and the storage device to a predetermined set of commands;

means for forwarding selected ones of commands in the intercepted communications to the storage device only when, based on the comparison, the commands that are in a predetermined set of commands are determined to be commands that are known to not permanently modify a state of the storage device; and means for blocking other ones of the commands from being received by the storage device based on the comparison, wherein the blocking device operates transparently to normal operation of the host and the storage device.

41. The blocking device of 40, wherein the storage device is an integrated device electronics (IDE) disk drive.

42. The blocking device of 40, wherein the commands forwarded to the storage device include a capabilities request command, and the means for forwarding further comprises:

means for modifying data received from the storage device relating to the capabilities request command to reflect the capabilities of the blocking device.

43. The blocking device of 40, further comprising:

means for returning status information to the host that indicates that the blocked command was successfully executed by the storage device.

44. The blocking device of claim 2, wherein the interface emulator is configured to emulate an IEEE 1394 connection.

45. The computer system of claim 31, wherein the interface emulator emulates an IEEE 1394 connection and the storage device is an IDE disk drive.

\* \* \* \* \*

UNITED STATES PATENT AND TRADEMARK OFFICE
CERTIFICATE OF CORRECTION

PATENT NO. : 6,813,682 B2
DATED : November 2, 2004
INVENTOR(S) : Steven Bress et al.

It is certified that error appears in the above-identified patent and that said Letters Patent is hereby corrected as shown below:

Column 15,
Line 6, insert -- blocks -- after "circuit."

Signed and Sealed this

Eighteenth Day of January, 2005

JON W. DUDAS
*Director of the United States Patent and Trademark Office*